US007441493B2

(12) United States Patent
Beetz et al.

(10) Patent No.: US 7,441,493 B2
(45) Date of Patent: Oct. 28, 2008

(54) SEALING DEVICE FOR A RADIAL SWIVEL MOTOR

(75) Inventors: Stefan Beetz, Barnim (DE); Klaus Reichei, Domsühl (DE); Torsten Baustian, Crivitz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 273 days.

(21) Appl. No.: 10/598,425

(22) PCT Filed: Mar. 1, 2005

(86) PCT No.: PCT/DE2005/000349

§ 371 (c)(1), (2), (4) Date: Aug. 29, 2006

(87) PCT Pub. No.: WO2005/085687

PCT Pub. Date: Sep. 15, 2005

(65) Prior Publication Data

US 2007/0170796 A1 Jul. 26, 2007

(30) Foreign Application Priority Data

Mar. 1, 2004 (DE) ....................... 10 2004 010 432

(51) Int. Cl.
*F01C 9/00* (2006.01)
*F16J 15/10* (2006.01)

(52) U.S. Cl. .......................................... 92/124; 92/125

(58) Field of Classification Search ................... 92/120, 92/121, 122, 123, 124, 125; 277/407
See application file for complete search history.

(56) References Cited

U.S. PATENT DOCUMENTS

| | | | | |
|---|---|---|---|---|
| 3,207,047 A | 9/1965 | O'Connor | | |
| 6,181,034 B1 * | 1/2001 | Reichel et al. | ................ | 92/125 |
| 6,184,598 B1 * | 2/2001 | Reichel et al. | ................ | 92/125 |
| 6,429,551 B1 * | 8/2002 | Beetz et al. | ................... | 92/125 |
| 6,520,068 B1 * | 2/2003 | Collier et al. | ................. | 92/124 |
| 6,880,451 B2 * | 4/2005 | Beilner et al. | ................. | 92/121 |

FOREIGN PATENT DOCUMENTS

| | | |
|---|---|---|
| DE | 19918665 A1 | 10/2000 |
| DE | 19935234 C1 | 11/2000 |
| DE | 19927619 A1 | 12/2000 |
| DE | 19927621 A1 | 12/2000 |

* cited by examiner

*Primary Examiner*—Thomas E Lazo
(74) *Attorney, Agent, or Firm*—McGlew & Tuttle, P.C.

(57) ABSTRACT

Swivel motors have a large number of tightness problems on the inside, in particular in a broad operating temperature range. Therefore, to improve the tightness over a temperature range of −40° C. to +130° C., a sealing device (20) is provided with an inner soft sealing element (20) and a plurality of outer rigid sealing elements (21, 22, 23, 24). The soft sealing element (20) and the rigid sealing elements (21, 22, 23, 24) are undetachably connected to one another. The circumferential sealing surfaces of the rigid sealing elements (21, 22, 23, 24), in the unloaded state, close flush with the sealing surface of the soft sealing element (20). The rigid sealing elements (21, 22, 23, 24) are spaced apart from one another by at least one radial compensating groove (25) and at least one axis-parallel compensating groove (26). The compensating grooves (25, 26) are arranged on both sides of the sealing device, such that the compensating grooves (25, 26) on one side are not overlapped by the compensating grooves (25, 26) on the other side.

15 Claims, 3 Drawing Sheets

SEALING DEVICE FOR A RADIAL SWIVEL MOTOR

CROSS REFERENCE TO RELATED APPLICATIONS

This application is a U.S. National Phase application of International Application PCT/DE2005/000349 and claims the benefit of priority under 35 U.S.C. §119 of German Application DE 10 2004 010 432.8 filed Mar. 1, 2004, the entire contents of which are incorporated herein by reference.

FIELD OF THE INVENTION

The present invention pertains to a sealing device for a radial swivel motor. Swivel motors of this type are particularly used in automobile construction as well as in aeronautics and space travel.

BACKGROUND OF THE INVENTION

A radial swivel motor usually consists of a housing, which has at least one stator wing in the interior and is closed on the faces with covers, and of a rotor, which is composed of a driven shaft mounted in the covers and at least one rotor wing. The rotor wing is pivotable against the stator wing of the housing only to a limited extent and thus forms, with the stator wing, at least one pressure chamber and one inlet chamber.

To guarantee the inner tightness between the pressure chamber and the inlet chamber, both the rotor wing and the stator wing are equipped with a form-fitting sliding sealing element, which rests against the lateral covers and against the inner wall of the housing or against the rotor. Again and again, a great number of tightness problems occur right in this area because the sealing elements are subject to increased wear. This is due to the limited rotary motion of the rotor, which changes again and again, and because the sealing elements are also exposed to a very broad operating temperature range.

A few suggestions have already become known for solving these problems. Thus, DE 199 35 234 C1 describes an embodiment of the sliding sealing element, which consists of a filler piece that carries a circular sealing body under pretension, whereby the filler piece is embodied as divided and thus longitudinally mobile parallel to one another, and at least one spring element is arranged between the filler pieces. Thus, the filler pieces are twisted by forces each acting in opposition to one another. The drawback of this sealing variant is that the sealing strip consists of a large number of component parts and thus it is expensive to manufacture and complicated to mount. Moreover, the spring elements consisting of a soft material have only a low volume, so that the pretension forces produced are therefore also very low. What's more, the spring elements only act in the radial direction. All of this leads to leakage.

Supporting the action of an elastic pretension element with one or more metal springs integrated in the pretension element is now known from DE 199 27 619 A1, whereby the metal spring may be a diaphragm spring, corrugated spring, coil spring or compression spring. The pretension forces for the sealing elements are increased by means of the additional metal springs; however, this solution can hardly be technically embodied for this purpose. The compression springs must act, namely, in the radial and axis-parallel directions in relation to the axis of rotation and thus the compression springs must also be arranged in an intersecting manner. This requires a very wide mounting space in the axial direction, which is simply not present because of the dimensions of the rotor wing or of the stator wing.

On the other hand, DE 199 27 621 A1 discloses a strip-like sliding sealing element that consists of a first square sealing frame made of PTFE, a second square sealing frame made of PTFE and a pretension element made of an elastomer. Both sealing frames and the pretension element are designed as being of the same size and are joined together in a sandwich-like manner into a pack by bonding or by vulcanization, and both sealing frames are arranged offset to one another both in the radial and axial directions. The pretension element is arranged between the two sealing frames and, with corresponding lateral projections, engages in the cavities of the two sealing frames, so that the two sealing frames, when installed in the swivel motor, are pretensioned in opposition by the forces of the pretension element equally in the radial and axial directions.

All of the solutions mentioned have in common the fact that the actual sealing element consists of a hard plastic PTFE and is loaded by a corresponding spring element to reduce the sealing gap. This spring element is usually an elastomer material. Sealing elements made of PTFE have good sliding properties, as a result of which they are actually readily suitable for sealing components sliding on one another. However, an open sealing gap, through which compressed oil can overflow, always remains for manufacturing reasons. The size of the sealing gap is, however, also dependent on the operating temperature of the swivel motor. Thus, the sealing gap expands as the temperature becomes lower, while with a higher temperature the contact pressure of the sealing elements at the housing parts increases. With an expanding sealing gap, the waste oil stream increases, and with a higher contact pressure, the wear of the sealing elements increases. Both are unwanted.

All the sliding sealing elements mentioned are thus unsuitable for the required temperature range of −40° C. to 130° C.

SUMMARY OF THE INVENTION

Therefore, the basic object of the present invention is to develop a sealing device, whose sealing gaps between the pressure chamber and the inlet chamber of the swivel motor are independent of the temperature.

According to the invention, a sealing device or arrangement for a radial swivel motor is provided. The swivel motor includes a stator with at least one stator wing and a rotor with at least one rotor wing, which form at least one sealing chamber and one inlet chamber and which are equipped with a sealing device each for sealing in the inward direction. Each sealing device is pressed into a mounting groove of the rotor wing and a mounting groove of the stator wing. Each sealing device includes outer rigid sealing elements and a pretension element made of an elastomer connecting the outer rigid sealing elements to one another. The sealing device includes a pretension element designed as a soft sealing element. The outer rigid sealing elements have a multipart design, whereby the soft sealing element and the rigid sealing elements are connected undetachably to one another. The circumferential sealing surfaces of the rigid sealing elements, in the unloaded state, close flush with the sealing surface of the soft sealing element. The rigid sealing elements are spaced apart from one another by at least one radial compensating groove and at least one axis-parallel compensating groove. The compensating grooves are arranged on both sides of the sealing device, such that the compensating grooves on one side are not overlapped by the compensating grooves on the other side.

The novel sealing device eliminates the above-mentioned drawbacks of the state of the art. Thus, the novel sealing device is primarily characterized by a very good sealing function. This can be mainly attributed to the novel combination of various types of sealing elements. Thus, the novel sealing device breaks with the bias that soft packings are unsuitable for relative motions directed at an angle to the sealing element, as they occur precisely in swivel motors. This is achieved by the rigid sealing elements on both sides of the soft sealing element, which, on the one hand, take charge of a support function for the soft sealing element and which, at the same time, smooth the housing parts, such that the soft sealing element continues to be protected from the unevennesses of the metallic housing parts.

The high sealing function can also be attributed to the fact that, now with the two outer rigid sealing elements and the soft inner sealing element, three sealing parts are involved in the sealing function.

However, the particular advantage lies in the fact that the sealing device maintains its high sealing function even over a broad temperature range. Thus, the sealing function is largely independent of the temperature. This is achieved because the rigid sealing elements have a multipart design and are each loaded so strongly by the pretension (also referred to as compression) through the soft sealing element and by the hydraulic pressures prevailing in the compensating gaps that each volume contraction is compensated. This contraction is compensated in each direction, i.e., not only in the radial and axis-parallel directions, but also in the diagonal direction. Thus, a constantly high tightness on the entire circumference, i.e., also in the corners of the sealing device is guaranteed.

It is particularly advantageous when all the soft and rigid sealing elements are so dimensioned that sufficiently wide compensating gaps arise, so that, after the assembly which is carried out at room temperature, a sufficient gap remains for the contraction compensation. Thus, the sealing function can continue to be maintained even at correspondingly low temperatures.

It is also advantageous when the soft sealing element is designed such that the pretension to be achieved can be selected to be greater than the expected contraction of all the components involved in the sealing. This also makes use at low temperatures possible.

Furthermore, it is advantageous if the compensating gaps are designed as compressed-oil-carrying channels and are connected to the respective sealing chamber of the swivel motor. Thus, the rigid sealing elements can be loaded with a hydraulic pressure, whose forces support the pretension forces. This increases the tightness over the entire temperature range.

It is also advantageous if the soft sealing element and the rigid sealing elements are undetachably connected to one another by bonding or by vulcanization. As a result of this, the entire sealing device becomes one component, which greatly reduces the assembly effort of the swivel motor.

The present invention shall be explained in detail based on exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
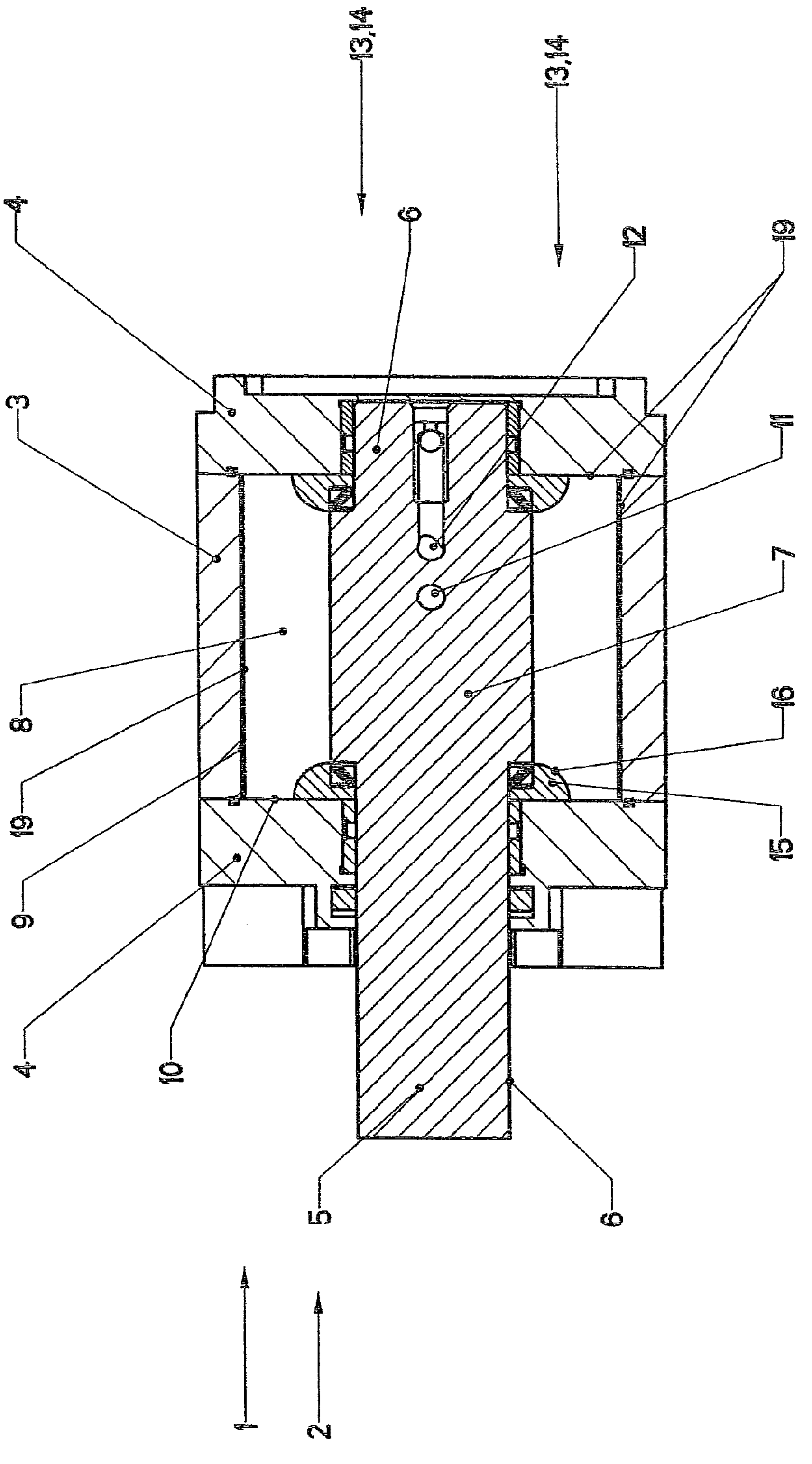
FIG. 1 is the longitudinal sectional view of a swivel motor and sealing device according to the invention.

Referring to the drawings in particular, the radial swivel motor according to FIG. 1 comprises mainly of an outer stator 1 and an inner rotor 2. The stator 1 is composed of a housing 3 and of covers 4 arranged on both faces of the housing 3, which are connected to one another via bolts (not shown). Both covers 4 have a bearing bore each. A cylindrical housing bore, which is split into two opposite free spaces along two opposite and radially directed stator wings, is located in the interior of the housing 3.

The rotor 2 includes a driven shaft 5 with bearing journals 6 on both sides and with a cylindrical part 7 lying between them. Two opposite and radially directed rotor wings 8 are arranged in the area of this cylindrical part 7. The rotor 2 is installed in the housing 3 of the stator 1 such that an axis-parallel sealing gap 9 each is formed between the head of the rotor wing 8 and the inner wall of the housing 3 as well as between the head of the stator wing and the peripheral area of the cylindrical part 7.

A radial sealing gaps 10 arise between the faces of the rotor wing 8 and the faces of the stator wing and the inner areas of the two covers 4 on both sides. Therefore, each rotor wing 8 splits one of the two free spaces in the housing 3 into a sealing chamber and into an outlet chamber, so that two opposite sealing chambers and two opposite outlet chambers are produced. Both sealing chambers and both outlet chambers are connected to one another by inner channels 11 and 12, respectively, while one of the two sealing chambers is connected to an inlet connection 13 and one of the two outlet chambers is connected to an outlet connection 14.

A sliding packing ring 15 is placed axially displaceably on the driven shaft 5 in the transition area from the bearing journal 6 to the cylindrical part 7, so that the sliding packing ring 15, with its radial sliding surface and sealing surface, rests slidingly against the inner surface of the cover 4 and, with its axial sealing surface, rests against the circumferential surface of the driven shaft 5. With these two sealing surfaces, the sliding packing ring 15 seals in the outward direction.

Between the internal surface of the sliding packing ring 15 and the rotor wing 8 or the stator wing, there is another radial sealing gap 16, which separates the adjacent pressure and outlet chambers from one another for inner tightness. This sealing gap 16 has an arched design corresponding to the shape of the sliding packing ring 15.

Figure 2:
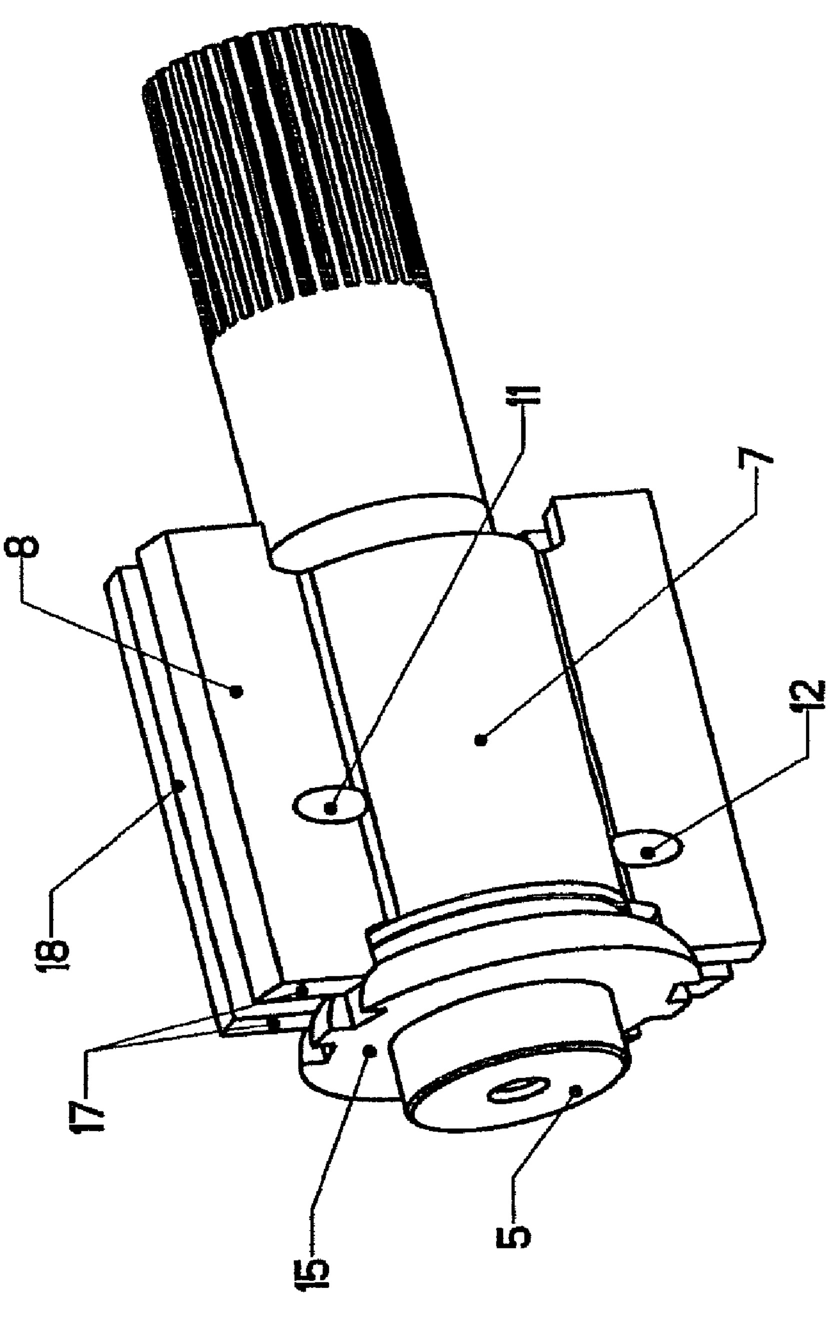
FIG. 2 is a perspective view of the rotor of the swivel motor of FIG. 1.

As FIG. 2 shows in particular, each rotor wing 8 and likewise each of the stator wings (not shown) has two parallel shanks 17, which form between them a mounting groove 18 for the novel sealing device 19. This mounting groove 18 is arranged in the middle and runs over the entire height and over the entire length of the rotor wing 8 or of the stator wing. The sealing device 19 is pressed into this mounting groove 18. Thus, the sealing device 19 seals the sealing gaps 9, 10 and 16 present on the circumference and on the faces of each rotor wing 8 and stator wing and provides for the inner tightness between the pressure and inlet chambers of the swivel motor.

Figure 3:
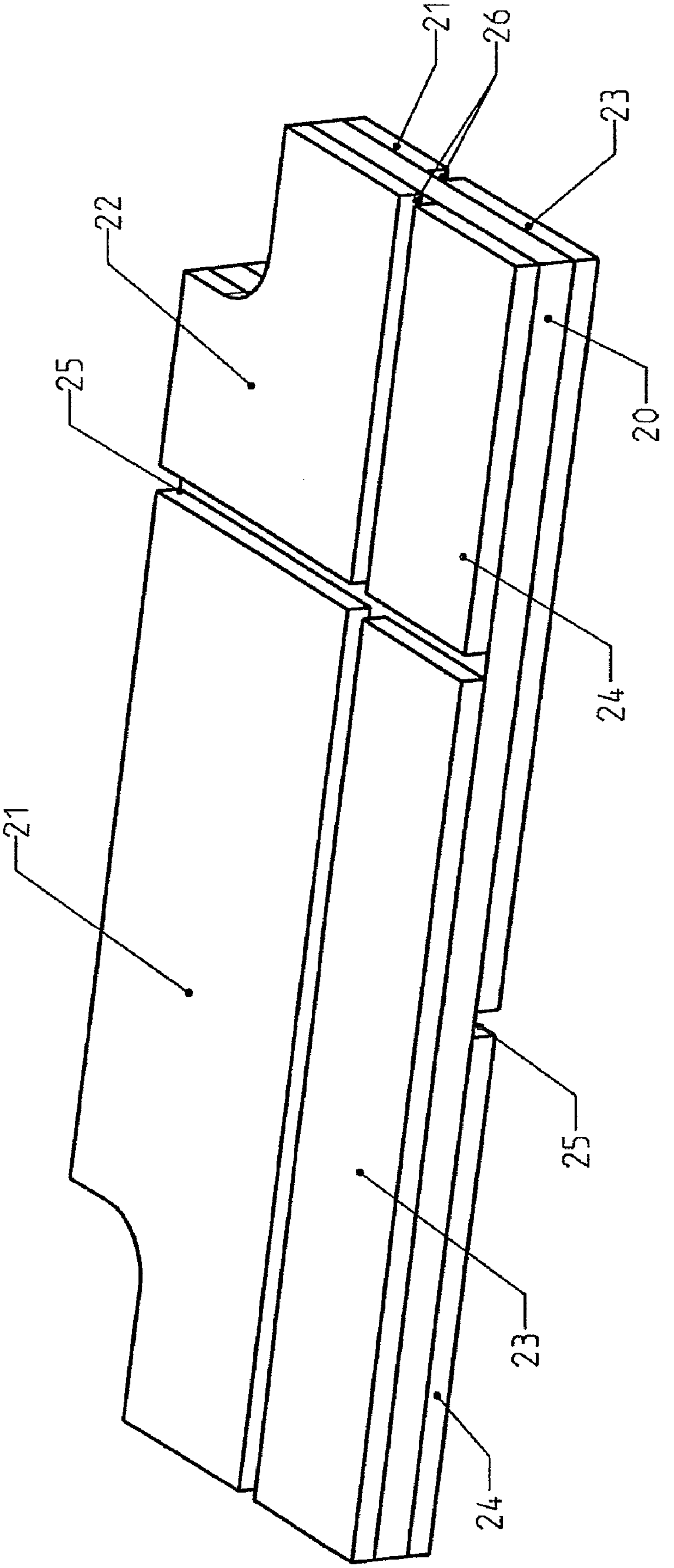
FIG. 3 is a perspective view of the sealing device in the unloaded state.

According to FIG. 3, the sealing device 19 consists of a sealing element 20 made of an elastomer, for example, a NBR (nitrile), a HNBR (hydrogenated nitrile) or a FPM (fluorinated rubber). This sealing element 20 has a length and a height, which are coordinated with the length and the depth of the mounting groove 18 in the rotor wing 8 or in the stator wing. A plurality of rigid sealing elements 21, 22, 23, 24 made of plastic are placed on both sides of the soft sealing element 20 and connected to one another in a sandwich-like manner by bonding or vulcanization. PTFE is preferably used as the plastic. The rigid sealing elements 21, 22, 23, 24 on each of the two sides of the soft sealing element 20 are embodied in their lengths and widths, such that they close flush with the soft sealing element 20 with their outer sealing surfaces and are spaced apart from one another by a radial compensating gap 25 and an axis-parallel compensating gap 26. Both compensating gaps 25, 26 on both sides of the soft sealing element 20 intersect, whereby they are arranged, such that the compensating gaps 25, 26 on one side are not overlapped by the compensating gaps 25, 26 on the other side. In terms of width, the soft sealing element 20 and the rigid sealing elements 21, 22, 23, 24 placed thereon are dimensioned, such that, in the sandwich pack, they exceed the width of the mounting groove 18 of the rotor wing 8 or of the stator wing by a press dimension.

The width of the radial and axis-parallel compensating gaps 25, 26 depends on the number and on the size of the rigid sealing elements 21, 22, 23, 24.

To mount this sealing device 19 into the mounting groove 18 of the rotor wing 8 and of the stator wing, the sealing device 19 is pressed together laterally to a sufficient extent, so that the soft sealing element 20 expands in all longitudinal directions. The rigid sealing elements 21, 22, 23, 24, which are fastened to the soft sealing element 20, also migrate outwards in all longitudinal directions. In this state, the sealing device 19 is pressed into its final position into the mounting groove 18. In the mounting of the thus completed rotor 2 with the housing 3 of the swivel motor, pressure is exerted from the housing 3 onto the expanded soft sealing element 20, and, consequently, the soft sealing element 20 is also pressed together in the front. In this case, the soft sealing element 20 builds up a pretension, which presses all rigid sealing elements 21, 22, 23, 24 against the respective walls of the housing parts. At the same time, the radial and axis-parallel compensating gaps 25, 26 are reduced to a predetermined distance. In this state, the soft sealing element 20 and all rigid sealing elements 21, 22, 23, 24 rest against the housing parts under the pretension of the soft sealing element 20 in a sealing manner. All sealing gaps 9, 10, 16 concerned are thus sealed.

During the operation of the swivel motor, compressed oil arrives from the respective pressure chamber laterally between the rigid sealing elements 21, 22, 23, 24 and thus into the radial and axis-parallel compensating gaps 25, 26. The pressure of the oil loads all adjacent rigid sealing elements 21, 22, 23, 24 and drives them apart. These forces thus support the pretension from the soft sealing element 20 on the rigid sealing elements 21, 22, 23, 24. During the motion of the rotor 2, the soft sealing element 20 and the rigid sealing elements 21, 22, 23, 24 slide on the inner walls of the housing parts in a constantly changing direction and thus have a joint share in the sealing function. On top of that, the rigid sealing elements 21, 22, 23, 24 take charge of a support function for the soft sealing element 20, as a result of which the soft sealing element 20 is protected. However, the rigid sealing elements 21, 22, 23, 24 are, to the same extent, subject to an intended abrasion because of the rough surface of the housing parts, as a result of which the unevennesses on the inner walls of the housing parts in terms of the manufacturing technique are exposed to the abrasion and a smooth surface forms on the housing parts. This reduces the sealing gap caused by the manufacture and protects the soft sealing element against premature destruction.

In the case of using in a lower temperature range, all components involved in the sealing contract to varying extents depending on the material properties and the dimensions, whereby the contraction of the soft sealing element 20 is the greatest. Because of a greater selected pretension and because of the forces originating from the compressed oil in the radial and axis-parallel compensating gaps 25, 26, the rigid sealing elements 21, 22, 23, 24 are, furthermore, pressed against the inner walls of the housing parts opposite the direction of contraction of the soft sealing element 20. During these motions of all sealing elements 20, 21, 22, 23, 24, the radial and axis-parallel compensating gaps increase. Thus, the sealing function continues to be maintained at low operating temperatures.

In the case of using at higher temperatures, all of the components involved in the sealing function expand. From the different tensions during the expansion process, forces occur, which support the pretension of the soft sealing element 20 on the rigid sealing elements 21, 22, 23, 24 and the hydraulic forces in the radial and axis-parallel compensating gaps 25, 26. The tightness increases as a result of this.

While specific embodiments of the invention have been shown and described in detail to illustrate the application of the principles of the invention, it will be understood that the invention may be embodied otherwise without departing from such principles.

The invention claimed is:

1. A sealing device for a radial swivel motor including a stator with at least one stator wing and a rotor with at least one rotor wing, which form at least one sealing chamber and one inlet chamber, the sealing device for sealing in the inward direction, whereby the sealing device is pressed into a mounting groove (18) of said rotor wing and of said stator wing, the sealing device comprising:

outer rigid sealing elements; and a pretension element made of an elastomer connecting said outer rigid sealing elements to one another, said pretension element comprising a soft sealing element and said outer rigid sealing elements providing a multipart construction, whereby said soft sealing element and said rigid sealing elements are connected undetachably to one another, circumferential sealing surfaces of said rigid sealing elements, in the unloaded state, end flush with the sealing surface of said soft sealing element, said rigid sealing elements are spaced apart from one another by at least one radial compensating groove and at least one said axis-parallel compensating groove, and said compensating grooves are arranged on both sides of said sealing device, such that said compensating grooves on one side are not overlapped by said compensating grooves on the other side.

2. A sealing device in accordance with claim 1, wherein said soft sealing element and said rigid sealing elements are dimensioned in length and depth and coordinated to one another such that they remain in said widely reduced compensating grooves even after the assembly of said sealing device.

3. A sealing device in accordance with claim 1, wherein said soft sealing element consists of such an elastomer and has such dimensions that the pretension resulting therefrom is greater than the contraction of said soft sealing element and said rigid sealing elements resulting from a reduction in temperature.

4. A sealing device in accordance with claim 1, wherein said radial compensating groove and said axis-parallel compensating groove are designed as compressed-oil-carrying channels and are connected to the respective sealing chamber of the swivel motor.

5. A sealing device in accordance with claim 1, wherein said soft sealing element and said rigid sealing elements are connected to one another by bonding or by vulcanization.

6. A radial swivel motor sealing device comprising:

outer rigid sealing elements; and a pretension element made of an elastomer connecting said outer rigid sealing elements to one another, said pretension element comprising a soft sealing element and said outer rigid sealing elements cooperating with said soft sealing element to provide a multipart construction, wherein:

said soft sealing element and said rigid sealing elements are connected undetachably to one another;

circumferential sealing surfaces of said rigid sealing elements, in an unloaded state terminate flush with the sealing surface of said soft sealing element;

said rigid sealing elements are spaced apart from one another by at least one radial compensating gap and at least one said axis-parallel compensating gap; and said compensating gaps are arranged on both sides of said sealing device, such that said compensating gaps on one side are not overlapped by said compensating gaps on the other side.

7. A radial swivel motor sealing device in accordance with claim 6, wherein said soft sealing element and said rigid sealing elements are dimensioned in length and depth and coordinated to one another in said multipart construction to provide reduced compensating gaps after the assembly of said sealing device.

8. A radial swivel motor sealing device in accordance with claim 6, wherein said soft sealing element consists of such an elastomer and has such dimensions that the pretension resulting therefrom is greater than a contraction of said soft sealing element and said rigid sealing elements resulting from a reduction in temperature.

9. A radial swivel motor sealing device in accordance with claim 6, wherein said radial compensating gap and said axis-parallel compensating gap form compressed-oil-carrying channels and are connected to the respective sealing chamber of the swivel motor.

10. A radial swivel motor sealing device in accordance with claim 6, wherein said soft sealing element and said rigid sealing elements are connected to one another by bonding or by vulcanization.

11. A radial swivel motor comprising:

a stator;

a rotor with a rotor wing;

a sealing device comprising a pretension element made of an elastomer comprising a soft sealing element and said outer rigid sealing elements connected to said soft sealing element, wherein said soft sealing element and said rigid sealing elements are connected undetachably to one another, circumferential sealing surfaces of said rigid sealing elements, in an unloaded state terminate flush with the sealing surface of said soft sealing element, said rigid sealing elements are spaced apart from one another by at least one radial compensating gap and at least one said axis-parallel compensating gap, and said compensating gaps are arranged on both sides of said sealing device, such that said compensating gaps on one side are not overlapped by said compensating gaps on the other side, said sealing device being pressed into a mounting groove of said rotor wing for sealing at least one sealing chamber and one inlet chamber.

12. A radial swivel motor in accordance with claim 11, wherein said soft sealing element and said rigid sealing elements are dimensioned in length and depth and coordinated to one another to provide reduced compensating gaps after the assembly of said sealing device.

13. A radial swivel motor in accordance with claim 11, wherein said soft sealing element consists of such an elastomer and has such dimensions that the pretension resulting therefrom is greater than a contraction of said soft sealing element and said rigid sealing elements resulting from a reduction in temperature.

14. A radial swivel motor in accordance with claim 11, wherein said radial compensating gap and said axis-parallel compensating gap form compressed-oil-carrying channels and are connected to the respective sealing chamber of the swivel motor.

15. A radial swivel motor sealing device in accordance with claim 11, wherein said soft sealing element and said rigid sealing elements are connected to one another by bonding or by vulcanization.

* * * * *